United States Patent [19]

Bendig et al.

[11] 4,176,171

[45] Nov. 27, 1979

[54] HIGH PORE VOLUME ALUMINA FROM DILUTE HIGH INJECTION ALKOXIDE FEED

[75] Inventors: Larry L. Bendig, Ponca City, Okla.; John F. Scamehorn, Austin, Tex.; Donald E. Stowell, Ponca City, Okla.

[73] Assignee: Continental Oil Company, Ponca City, Okla.

[21] Appl. No.: 933,310

[22] Filed: Aug. 14, 1978

[51] Int. Cl.$^2$ .............................................. C01F 7/02
[52] U.S. Cl. .................................... 423/628; 423/630
[58] Field of Search ................................ 423/628, 630

[56] References Cited

U.S. PATENT DOCUMENTS

| | | | |
|---|---|---|---|
| 2,796,326 | 6/1957 | Kimberlin et al. | 423/630 |
| 2,917,366 | 12/1959 | Hansford | 423/630 |
| 3,394,990 | 7/1968 | Weingartner et al. | 423/630 |
| 3,419,352 | 12/1968 | Acciarri | 423/630 |
| 4,024,231 | 5/1977 | Ziegenhain | 423/630 |
| 4,117,106 | 9/1978 | Bendig et al. | 423/630 |
| 4,133,871 | 1/1979 | Ziegenhain et al. | 423/628 |

*Primary Examiner*—Herbert T. Carter
*Attorney, Agent, or Firm*—Cortlan R. Schupbach, Jr.

[57] ABSTRACT

An improved method for increasing alumina pore volumes said alumina being produced by the hydrolysis of aluminum alkoxides, the improvement comprising diluting the aluminum alkoxide, prior to entering the hydrolysis reactor, with an alkanol containing from 2 to 8 carbon atoms and injecting the dilute solution into the reactor at high velocities.

4 Claims, No Drawings

HIGH PORE VOLUME ALUMINA FROM DILUTE HIGH INJECTION ALKOXIDE FEED

This invention relates to an improved method for producing alumina having high macropore content and high overall pore volume. More particularly, this invention relates to a method for producing alumina having a high percentage of pores above 1,000 angstrom in size by diluting aluminum alkoxides with a 2-8 carbon atom alkanol and injecting this diluted feed under conditions of high velocity into a hydrolysis reactor.

Alumina catalysts having a high content of large pores above 1,000 angstroms in diameter are desirable for many purposes. For example, the liquid phase methylation of phenols to form methylated products such as cresols, 2,3,6-trimethylphenol and the like; bimodal auto exhaust pellets and so forth. However, production of alumina catalyst having sufficiently high pore volume has long been a problem. This is especially true when the catalysts are used in pelletized form and extrusion techniques, since extrusion tends to crush and deform the pores. In our co-pending application Ser. No. 880,830 we discussed a method of utilizing a rotating wheel in place of an extruder for maintaining high pore volume catalysts which are derived from the high injection velocity of aluminum alkoxides. The high injection velocity of aluminum alkoxides was taught therein to produce a high proportion of macropore content.

The aluminas of the instant invention are derived from the hydrolysis of aluminum alkoxides, which procedure is generally described and exemplified in U.S. Pat. Nos. 3,264,063; 3,357,791; 3,419,352; 3,867,296; 3,907,512; 3,918,808; and 3,933,685. Production of high pore volume alumina is set forth in U.S. Pat. Nos. 3,975,509; 3,975,510; and 4,024,231. However, none of these processes produced alumina having high macropore content by processes such as those of the instant invention. It would be desirable to provide a simple and effective method for producing high macropore content alumina catalysts.

The aluminum alkoxides utilized in the instant invention can be conveniently prepared from a mixture of high molecular weight aluminum trialkyls by the Zeigler method. The aluminum trialkyls are then oxidized to the corresponding aluminum alkoxides.

A typical aluminum alkoxide hydrolysis process is one wherein the water and the aluminum alkoxides are fed continuously to a reactor. In the reactor two operations occur. First the aluminum alkoxides are hydrolyzed forming alumina and alcohols. Second a phase split occurs between the water alumina slurry and the alcohols. Subsequently, the alcohols and alumina water phases are withdrawn from the reactor. The alumina water slurry is subjected to further processing to eventually obtain the dried alumina substantially free of alcohols.

It is therefore an object of the instant invention to provide a simple and effective method for producing high macropore content alumina catalyst. Other objects will become apparent to those skilled in this art as the description proceeds.

It has now been discovered according to the instant invention that when aluminum alkoxides are diluted with an alkanol having from about 2 to about 8 carbon atoms and then hydrolyzed under conditions of high injection velocity, a high pore volume alumina is obtained whose pores contain a larger percentage of extremely large macropores than obtained from high injection velocity aluminas alone. This result is extremely surprising since the dilution of an alkoxide feed under conditions of non-high injection velocity does not produce additional increased pore volume.

Thus the instant invention relates to an improved method for producing aluminas having increased macropore volume in the hydrolysis of aluminum alkoxides, the improvement comprising diluting the aluminum alkoxides with an alkanol containing from 2 to 8 carbon atoms then injecting the diluted aluminum alkoxide into a hydrolysis reactor at velocities greater than 40 feet per second, said velocity defined by the formula $V=(F/PA)$ wherein V is velocity in feet per second, F is the rate of flow as pounds of dilute feed per second, P is density in pounds per cubic foot, and A defines orifice area in square feet.

This method is particularly suitable for use with aluminum alkoxides derived from the oxidation of aluminum trialkyls. The alkyl groups in these aluminum alkyls usually contain from 2 to 40 carbon atoms and a predominant amount of 8 to 16 carbon atom alkyls. However, any aluminum alkoxide containing 2 or more carbon atoms in the alkoxy group can be used. Usually the alkoxy group contains a maximum of 40 carbon atoms, more usually a maximum of 30. In normal use the aluminum alkoxides are mixtures containing alkoxy groups of different carbon atom content.

Whatever the aluminum alkoxide used, said alkoxide is admixed with an alkanol containing from 2 to 8 carbon atoms. The dilution can be made to an extent wherein the hydrolysis feed contains from about 10% to any amount desired by weight of alkanol. Mixtures of alkanols can, of course, be used. Normally, the amount of alcohol used will range from about 20% to about 70% by weight of the total alkoxide feed, with about 20% to about 50% most preferred.

Representative examples of alkanols useful in the practice of the present invention are ethanol, propanol, butanol, pentanol, hexanol, heptanol, octanol, isopropanol and isobutanol.

The diluted alkoxide is then injected into the water phase of a hydrolysis reactor, or preferably is admixed with water under high velocity conditions prior to passing the resulting admixture into the hydrolysis reactor. The term "high velocity" as used herein means mixing of greater than 40 feet per second, preferably greater than 100 feet per second. Preferred velocities are from about 45 to about 250 feet per second.

The relative amounts of water used in the hydrolysis of aluminum alkoxide will normally be in the range of from about 0.5 to about 5 pounds of water per pound of aluminum alkoxide. In any event, a stoichiometric excess of water should be used to produce a pumpable slurry. The aluminum alkoxide normally sufficient to form a pumpable slurry is at a temperature in the range of about 50° to about 150° C. and the water is normally at a temperature in the range of about 40° to about 150° C.

The water/aluminum alkoxide admixture is then passed to the reactor, the remainder of the process being as described in the previous sections of this application and the references cited.

The alumina produced by the process of this invention will normally contain from about 25 to about 60 percentage of its pore volume in the range from about 1,000 to about 10,000 angstroms in size. However, preferred high pore volume content (above 1,000 angstroms) is from about 30 to about 50 percentage of the total pore volume.

Thus the alkanol dilution of the aluminum alkoxide provides a means of producing a more porous alumina with the significant fraction of these pores being retained after extrusion. This improvement occurs only when the alkoxide enters the reactor at a high velocity and the alumina alkoxide has been previously diluted with an alkanol having from 2 to 8 carbon atoms. Thus it is apparent that the combination of high injection velocity and alkoxide dilution have a synergistic effect. This is especially surprising since non-high injection velocity diluted aluminum alkoxide feeds do not show any pore volume increase.

The invention is more concretely described with reference to the examples below wherein all parts and percentages are by weight unless otherwise specified. The examples are provided to illustrate the instant invention and not to limit it.

The effect of diluting the aluminum alkoxide feedstock can be seen in Table 1 with regard to powder properties and Table 2 with regard to extrudate properties. Test 1 is a control run using low alkoxide injection velocity and no alcohol dilution. Tests 2 and 3 were made under the same conditions as Test 1 except for the dilution of aluminum alkoxide with butanol. It should be noted that no significant effect was observed. Test 4 was made under high aluminum alkoxide injection velocity conditions. Tests 5 and 6 were made under similar conditions except that the aluminum alkoxide was diluted with 20 weight percent butanol in Test 5 and 40 weight percent butanol in Test 6 and the material was oven dried instead of spray dried. Oven drying vs spray drying has almost no effect upon alumina properties. The effect of the butanol dilution is seen to be an increase in powder and extrudate pore volume and a decrease in extrudate packed bulk density. Test 7 was made under the same conditions as Test 5 except that a mixture of alcohols (A1FOL alcohols, Trademark of and sold by Continental Oil Company) instead of butanol for alkoxide dilution purposes. The mixed alcohols appeared to have little affect on the product. All tests except 4 were oven dried at 250° for 24 hours whereas 4 was spray dried at 260° F.

The tables below give all reaction conditions as well as the properties observed from the reaction conditions. Table 1 shows the effect of aluminum alkoxide dilution with alcohol on powder properties while Table 2 shows the effect of aluminum alkoxide dilution with alcohol on extrudate properties.

TABLE 1

EFFECT OF ALKOXIDE DILUTION ON POWDER PROPERTIES

| Test | 1 | 2 | 3 | 4 | 5 | 6 | 7 |
|---|---|---|---|---|---|---|---|
| INDEPENDENT PROCESS VARIABLES | | | | | | | |
| Hydrolysis | | | | | | | |
| Injection Nozzle Diameter (inches) | 0.158 | 0.158 | 0.158 | 0.031 | 0.031 | 0.031 | 0.031 |
| Reactor Temperature (°F.) | 203 | 202 | 205 | 205 | 202 | 202 | 203 |
| Alkoxide Temperature (°F.) | 181 | 183 | 188 | 184 | 181 | 186 | 193 |
| Water Temperature (°F.) | 196 | 197 | 207 | 178 | 199 | 204 | 206 |
| Recycle Butanol Temperature (°F.) | 164 | 168 | 164 | 122 | 165 | 165 | 172 |
| Water pH | 12 | 12 | 12 | 12 | 12 | 12 | 12 |
| Alkoxide Flow Rate (lb./hr.) | 176 | 176 | 176 | 180 | 180 | 164 | 163 |
| Water Flow Rate (lb./hr.) | 190 | 190 | 190 | 195 | 190 | 190 | 176 |
| Alkoxide Injection Velocity (ft./sec.) | 6.7 | 6.7 | 6.7 | 178 | 178 | 162 | 162 |
| Extractor | | | | | | | |
| Extractor Temperature (°F.) | — | — | — | 184 | — | — | — |
| Butanol Temperature (°F.) | 185 | 196 | 202 | 193 | 189 | 195 | 200 |
| Extraction System (Column/Mixer-Settler) | Mixer-Settler | Mixer-Settler | Mixer-Settler | Column | Mixer-Settler | Mixer-Settler | Mixer-Settler |
| Steam Stripper | | | | | | | |
| Stripping Pressure (psia) | 14.2 | 14.2 | 14.2 | 14.2 | 14.2 | 14.2 | 14.2 |
| PRODUCT POWDER PROPERTIES | | | | | | | |
| Surface Area ($M^2$/GM) | 252 | 251 | 283 | 312 | 304 | 279 | 313 |
| Loose Bulk Density (lb./$ft.^3$) | 51.4 | 55.2 | 52.9 | 28.4 | 25.8 | 23.7 | 43.1 |
| Carbon Content (W/O) | 0.85 | 0.56 | 1.11 | 0.31 | 0.31 | 1.13 | 3.48 |
| $Al_2O_3$ Content (W/O) | 80.2 | 77.9 | 79.2 | 71.2 | 77.7 | 74.3 | 69.5 |
| Acid Dispersibility (W/O) | 85.4 | 91.0 | 68.6 | 67.0 | 39.4 | 26.7 | 10.3 |
| PORE VOLUME DISTRIBUTION (CC/GM) | | | | | | | |
| O–50A | 0.06 | 0.09 | 0.18 | 0.14 | 0.06 | 0.07 | 0.14 |
| O–100A | 0.40 | 0.39 | 0.34 | 0.43 | 0.31 | 0.31 | 0.41 |
| O–250A | 0.42 | 0.39 | 0.36 | 0.48 | 0.40 | 0.40 | 0.50 |
| O–500A | 0.42 | 0.39 | 0.37 | 0.52 | 0.47 | 0.47 | 0.57 |
| 0–1,000A | 0.42 | 0.41 | 0.37 | 0.55 | 0.54 | 0.56 | 0.65 |

TABLE 1-continued

EFFECT OF ALKOXIDE DILUTION ON POWDER PROPERTIES

| Test | 1 | 2 | 3 | 4 | 5 | 6 | 7 |
|---|---|---|---|---|---|---|---|
| 0-10,000A | 0.46 | 0.44 | 0.41 | 0.74 | 1.09 | 1.14 | 0.69 |

TABLE 21

EFFECT OF ALKOXIDE DILUTION ON EXTRUDATE PROPERTIES

| POWDER TEST | 1 | 2 | 3 | 4 | 5 | 6 | 7 |
|---|---|---|---|---|---|---|---|
| INDEPENDENT EXTRUSION VARIABLES | | | | | | | |
| Powder Used (GM) | 850 | 850 | 850 | 850 | 850 | 850 | 850 |
| Acetic Acid (2.25%) Used (ML) | 550 | 550 | 450 | 408 | 700 | 700 | 450 |
| Mull Time (Min.) | 9 | 4 | 8 | 2 | 14 | 10 | 20 |
| EXTRUDATE PROPERTIES | | | | | | | |
| Average Crush Strength (Lb./5 MM Length | 13.8 | 5.9 | 7.7 | 24.5 | 5.4 | 16.0 | 9.0 |
| Surface Area ($M^2$/GM) | 248 | 249 | 241 | 306 | 260 | 272 | 279 |
| Packed Bulk Density (Lb./Ft.$^3$) | 45.9 | 41.3 | 42.6 | 35.6 | 33.3 | 31.8 | 35.5 |
| Water Pore Volume (CC/GM) | 0.53 | 0.57 | 0.57 | 0.64 | 0.78 | 0.77 | 0.69 |
| Water Crack (Yes/No) | No | No | No | No | No | No | No |
| Pore Volume Distribution (CC/GM) | | | | | | | |
| 0-50A | 0.06 | 0.07 | 0.10 | 0.11 | 0.07 | 0.09 | 0.11 |
| 0-100A | 0.42 | 0.42 | 0.41 | 0.53 | 0.37 | 0.38 | 0.37 |
| 0-250A | 0.47 | 0.44 | 0.42 | 0.58 | 0.45 | 0.45 | 0.41 |
| O-500A | 0.48 | 0.45 | 0.44 | 0.58 | 0.49 | 0.48 | 0.46 |
| 0-1,000A | 0.48 | 0.45 | 0.45 | 0.59 | 0.51 | 0.56 | 0.51 |
| 0-10,000A | 0.49 | 0.47 | 0.47 | 0.59 | 0.63 | 0.78 | 0.54 |

The pore volumes shown in the examples were determined by the mercury penetration technique using pressures up to about 50,000 pounds per square inch gauge (psig). The tests were carried out using a mercury porous meter Model 905-1, manufactured by the Micrometrics Corporation of Norcross Virginia. Extrusion was made of alumina powder produced using the procedure shown in Table 2 for both the control, high injection velocity and dilute alkoxide high injection velocity methods. All extrusion mixes were made in a lab-size Baker-Perkins mix-muller with sigma type blades. The mix was extruded in a 2¼ inch pin barrel extruder.

Examination of the comparisons set forth in Tables 1 and 2 will show that the preparation and extrusion of aluminas prepared from normal injection velocity, and alcohol diluted aluminum alkoxides yields no significant pore volume increase. The use of high injection velocity alone will provide some pore volume increase although this gain is largely lost after extrusion. Finally, the combination of normally ineffective butanol dilution with high alkoxide injection velocity yields a surprisingly high pore volume increase in the number of macropores present, a large proportion of which will survive extrusion techniques, to provide an extremely efficient process for producing high macropore content aluminas for various uses.

Thus a direct comparison of the normal methods for making alumina from the hydrolysis of aluminum alkoxides, high injection velocity for aluminum alkoxides, and high injection velocity of alcohol diluted aluminum alkoxides is made. An examination of the comparative data will show that the pore volume of the high injection velocity alkanol diluted aluminum alkoxide is far superior prior to extrusion and retains its superiority even through the extrusion process.

In practice, the carrying out of the instant invention will depend somewhat upon the equipment available. However the critical parameters are the alkanol dilution of the aluminum alkoxide and the injection velocity (above 40 feet per second) provide a high pore volume alumina by utilizing a synergistic result discovered between alkanol diluted aluminum alkoxides and high injection velocity.

While certain embodiments and details have been shown for the purpose of illustrating this invention, it will be apparent to those skilled in this art that various changes and modifications may be made herein without departing from the spirit or scope of the invention.

We claim:

1. An improved method for producing alumina having from about 25 to about 60% of the total pore volume of the alumina from about 1,000 to about 10,000 angstroms from the water hydrolysis of aluminum alkoxides, the improvement comprising diluting the aluminum alkoxide with from about 20% to about 70% by weight with an alkanol containing from about 2 to about 8 carbon atoms, then injecting the diluted aluminum alkoxides into a hydrolysis reactor at velocities greater than 40 feet per second, said velocity defined by the formula $V=F/PA$ wherein V is velocity in feet per second, F is the rate of flow as pounds per second of dilute feed, P is density in pounds per cubic foot, and A is the orifice area in square feet.

2. A method as described in claim 1 wherein the alkanol is selected from the group consisting of ethanol, propanol, butanol, pentanol, hexanol, heptanol, octanol, isopropanol and isobutanol.

3. A method as described in claim 1 wherein the alkanol is selected from the group consisting of ethanol, butanol, propanol, pentanol, and hexanol.

4. A method as described in claim 3 wherein the high pore volume content (above 1,000 angstroms) of the alumina is from about 30 to about 50% of the total pore volume.

* * * * *